United States Patent
Middleton

(10) Patent No.: US 6,536,061 B1
(45) Date of Patent: Mar. 25, 2003

(54) METHOD AND APPARATUS FOR CLEANING OIL ABSORBENT MATERIALS

(76) Inventor: Richard G Middleton, 801 Brookwood Dr., Columbia, SC (US) 29201

( * ) Notice: Subject to any disclaimer, the term of this patent is extended or adjusted under 35 U.S.C. 154(b) by 265 days.

(21) Appl. No.: 09/654,860

(22) Filed: Sep. 5, 2000

Related U.S. Application Data

(63) Continuation of application No. 09/241,549, filed on Feb. 1, 1999, now Pat. No. 6,230,353, which is a continuation-in-part of application No. 09/071,649, filed on May 1, 1998, now Pat. No. 5,916,336, which is a continuation of application No. 08/694,619, filed on Aug. 13, 1996, now abandoned.

(51) Int. Cl.[7] .................................................. D06B 9/00
(52) U.S. Cl. ............................ 8/159; 68/18 C; 68/18 R
(58) Field of Search .......................... 68/12.02, 18 C, 68/18 F, 18 R; 8/142, 158, 159

(56) References Cited

U.S. PATENT DOCUMENTS

| | | | | |
|---|---|---|---|---|
| 2,188,353 A | * | 1/1940 | House | |
| 2,310,680 A | * | 2/1943 | Dinley | |
| 3,011,956 A | * | 12/1961 | Smith et al. | |
| 3,522,718 A | * | 8/1970 | Gillespie | |
| 3,600,911 A | * | 8/1971 | McLagan | |
| 3,689,211 A | * | 9/1972 | Giampalmi, Jr. et al. | |
| 3,746,508 A | * | 7/1973 | Landon | |
| 4,263,053 A | * | 4/1981 | McKinnon, Jr. | |
| 5,222,267 A | | 6/1993 | Fierro | |
| 5,244,566 A | * | 9/1993 | Bond | |
| 5,250,197 A | * | 10/1993 | Marcel | |
| 5,309,587 A | | 5/1994 | Fierro | |

* cited by examiner

Primary Examiner—Frankie L. Stinson
(74) Attorney, Agent, or Firm—Michael A. Mann; Sara A. Centioni; Nexsen Pruet Jacobs and Pollard, LLC

(57) ABSTRACT

A method and system for separating oil form oil-absorbent materials for recycle of both the oil and the materials. The method comprises placing the oil absorbent material on a grid over a catch basin to drain, then centrifuging the material to remove additional excess oil. The excess oil is processed to separate water, grit, dirt, metal chips and shavings from it so that it can be sent to a refinery. After centrifuging to remove excess oils, the materials are dry cleaned in doubly distilled dry cleaning fluid to remove additional oil so that the materials can be reused.

22 Claims, 2 Drawing Sheets

METHOD AND APPARATUS FOR CLEANING OIL ABSORBENT MATERIALS

PRIORITY CLAIM

The present application is a continuation of application Ser. No. 09/241,549, filed Feb. 1, 1999, now U.S. Pat. No. 6,230,353, which is a continuation-in-part of application Ser. No. 09/071,649, filed May 1, 1998, now U.S. Pat. No. 5,916,336, which is a continuation of application Ser. No. 08/694,619, filed Aug. 13, 1996, abandoned.

FIELD OF THE INVENTION

The present invention relates to a method and apparatus for separating oil from oil-absorbent materials so that both the materials and the oil can be recycled.

DISCUSSION OF BACKGROUND

The desorption of oil and other industrial lubricants from absorbent materials such as pads or "socks" is a prevalent industrial process. As a result, the current art contains a variety of different methods by which oil is either removed from an oil absorber or process after recovery for recycle of the oil or the materials are cleaned for reuse.

The steps that are used to separate and recover oil from oil-absorbing materials for recycle must be chosen so that the desired results: maximum recycling and minimum waste generation are achieved. This type of optimization inevitably results in a process that is specific to a particular waste stream; that is, it will be dictated by the oil absorber and the composition of absorbed fluids and entrained solids.

The steps that are used to clean the oil-absorbing materials are dictated by those processes that will result in the cleanest materials. However, the goals of maximum recycle of absorbed oil and cleanest materials are not obtained necessarily by the same processes.

Therefore, there remains a need for an oil recovery process that is simple, effective and that allows the recovery of the oil as well as the recycling of clean oil-absorbing material.

SUMMARY OF THE INVENTION

According to its major aspects and briefly stated, the present invention is a method and system for recovering oil and other lubricants from absorbent materials so that both the materials and the recovered oil can be recycled. In the case of the materials, recycle means that the materials are clean and ready for reuse following application of the present process. In the case of oil that is removed from these materials, recycle means that the oil may require refining but it is substantially free of water, dirt, and metal shavings, chips and particles.

The system comprises two major components: an excess oil removal component and a dry cleaning component. In the first component, excess oil is removed from the materials and then treated to separate clean oil from contaminated, dirty oil. In the second component, the cleaning component, there is a closed loop dry cleaning machine connected to a pair of industrial distillers, a dry cleaning fluid tank for storing the distilled dry cleaning fluid, and a waste container.

In the first component, substantial excess oil is drained by gravity into a sump. However, additional excess oil is removed by centrifuging. The excess oil that is removed is pumped to a settling tank where, after a period of time, the clean oil at the top is forwarded to a used oil container and the water-contaminated oil is sent to an evaporator. After evaporating the water from this water-contaminated oil, it, too, is forwarded to the used oil container.

In the cleaning component, the effluent from drycleaning the materials is distilled twice to remove as much oil from the dry cleaning fluid as possible and to assure that the drycleaning fluid, when reused to dry clean the materials, is as clean as possible. The oil removed from the distillers is contaminated and is handled accordingly.

An important feature of the present invention is the use of centrifuging in combination with dry cleaning. Centrifuging removes sufficient oil so that the absorbent materials could simply be reused as absorbers if desired, but could be cleaned if desired by simply washing them. Dry cleaning also, by itself, would clean the pads without the need for centrifuging although draining or wringing out materials saturated with oil prior to dry cleaning makes a good deal of sense. Importantly, centrifuging is not need to clean the materials and dry cleaning is not needed to recycle the oil in the materials. However, when the goal of the process is both to recycle absorbed oil and recycle clean oil-absorbing materials, as well as minimize the waste from the dry cleaning machine and limit damage from metal particles and chips, the combination of centrifuging and dry cleaning achieves these dual, conflicting goals.

A feature of the present invention is the first component. A considerable amount of oil can be removed from oil-absorbent materials simply by allowing them to drain; however, even less oil will remain in these materials after centrifuging. By minimizing the amount of residual oil in the materials in the first component of the present process, more oil is recovered and the dry cleaning component is more effective in cleaning the materials for recycle. Furthermore, metal chips and particles can be removed by centrifusing before drycleaning the materials Another important feature of the present invention is the use of two industrial distillers to separate dry cleaning fluid, preferably perchloroethyene, from the residual oil that has been removed from the oil absorbing materials through dry cleaning. The purpose of double distillation is to assure that the perchloroethylene that is repeatedly used for dry cleaning the materials is clean when it enters the dry cleaning machine for reuse.

Still another feature of the present invention is the use of gravity draining to remove excess oil before centrifuging. Not only does excess oil drain readily from the absorbing materials, but also particles and metal chips can be removed in this way. This step makes centrifuging and dry cleaning more efficient.

Yet another feature of the present invention is the use of an evaporator to remove water from the recovered oil. Oil/water separation by specific gravity prior to this step is a cost-effective way to obtain significant separation but oil recovery can be significantly improved by evaporation.

The use of an industrial distiller rather than a typical dry cleaning machine distiller is another important feature of the present invention. Because both the internal temperature and pressure can be precisely controlled, the independent distiller allows a more effective separation of the perchloroethylene from the lubricants. This in turn maximizes the purity of the recycled perchloroethylene and increases the recovery of lubricants.

Other features and advantages of the present invention will be apparent to those skilled in the art from a careful reading of the Detailed Description of a Preferred Embodiment presented below.

DETAILED DESCRIPTION OF A PREFERRED EMBODIMENT

Figure 1:
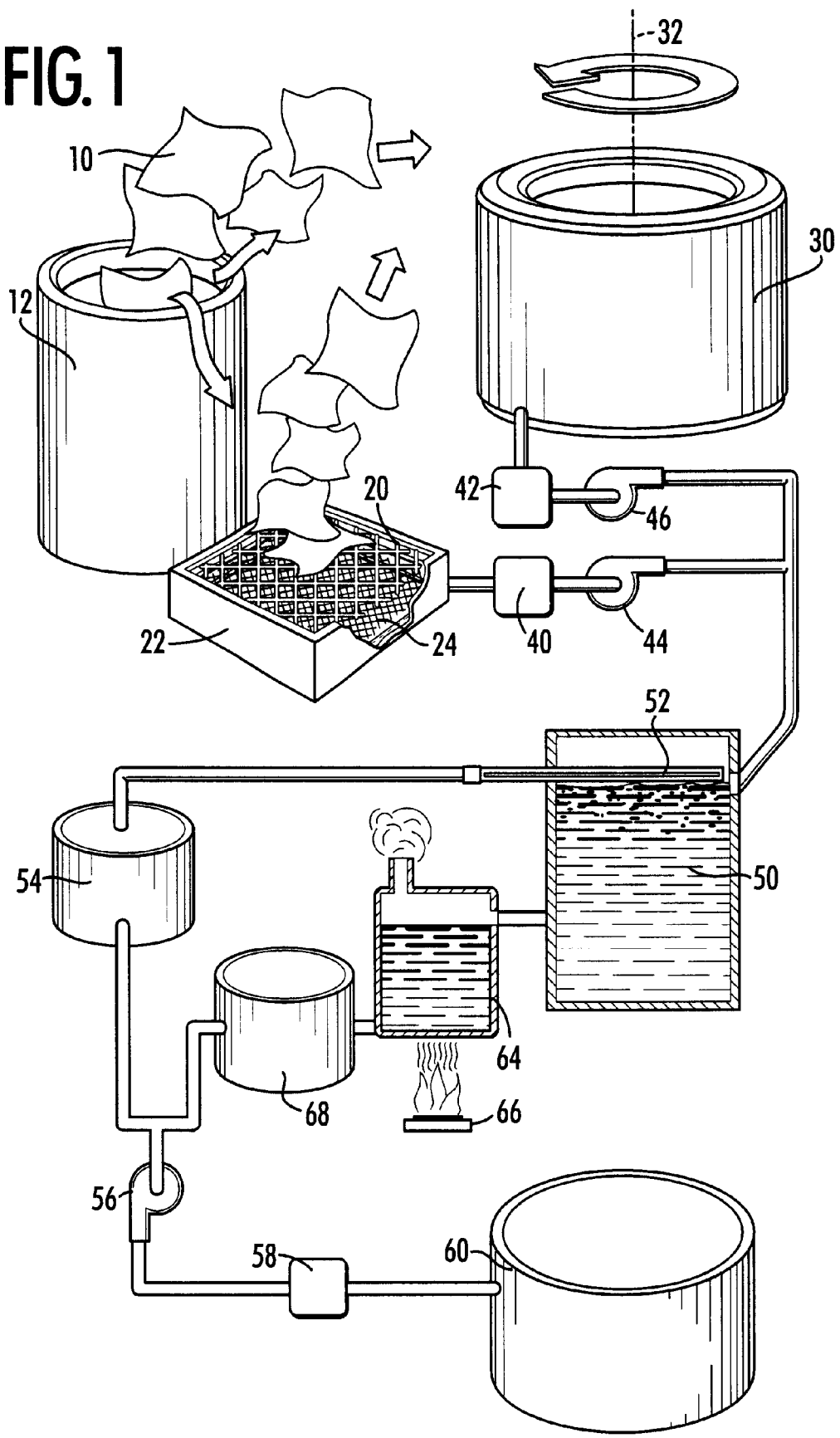
FIG. 1 is a schematic diagram of the first component of a recycling system according to a preferred embodiment of the present invention.
Figure 2:
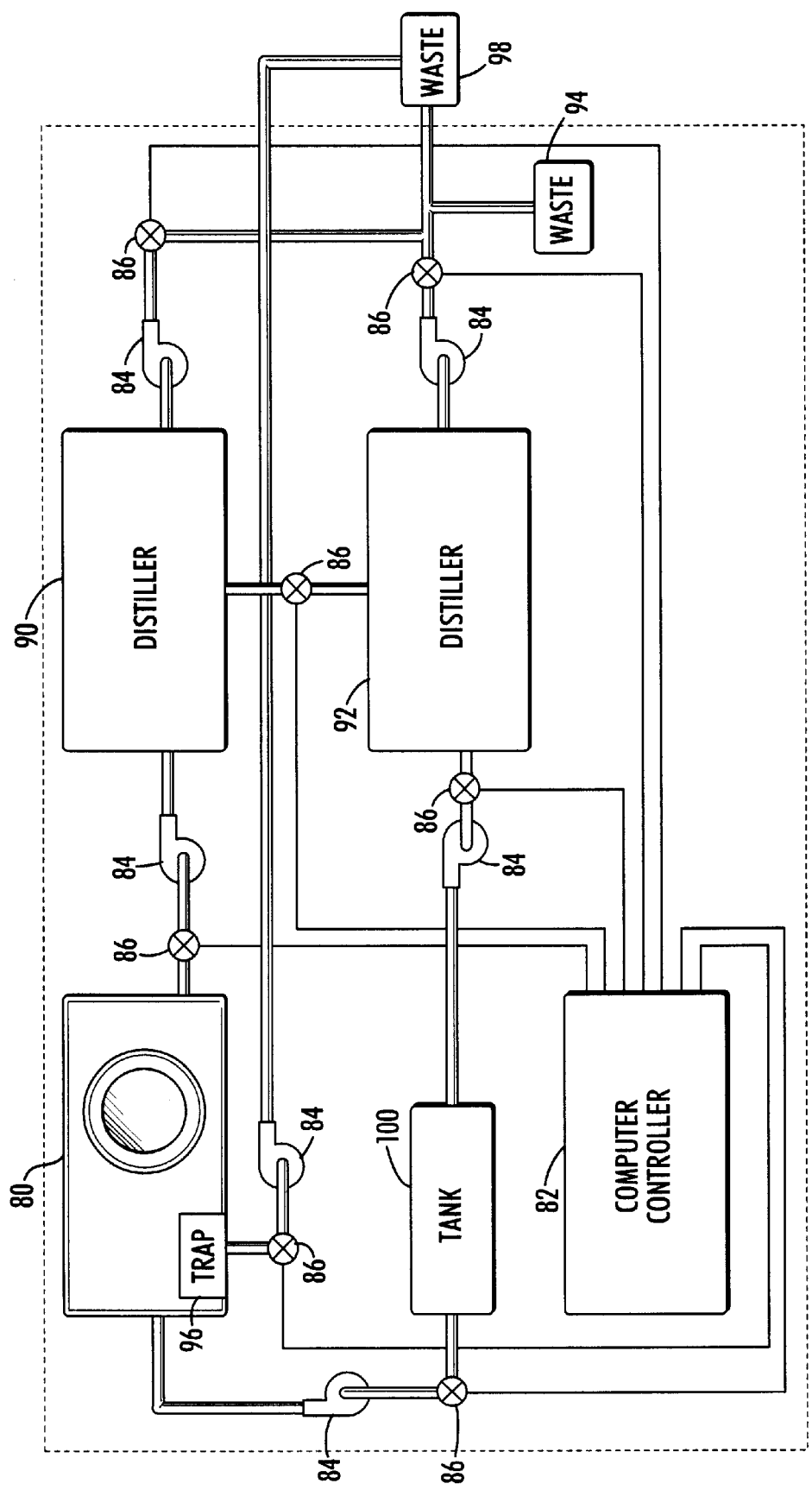
FIG. 2 is a schematic diagram of the second component of a recycling system according to a preferred embodiment of the present invention.

Referring now to FIGS. 1 and 2, there is shown a schematic diagram of a method and apparatus for separating oil from oil-absorbent materials according to a preferred embodiment of the present invention. Oil-absorbing materials include synthetic and natural, woven and non-woven pads and tubular "socks" that are customarily used in machine shops and metal fabricating plants to absorb spilled or leaking lubricants. These materials will be referred to herein and in the claims that follow as "pads" for convenience. Also, the present system is not intended for use with and will not work with solvents, only lubricants.

The goal of the present system is recycling; in particular, the present system recovers oil for recycling and cleans the oil-absorbing pads for reuse. The more effective the present system is, the more oil it recovers that can be recycled, the cleaner the oil-absorbing pads are and the less hazardous waste it generates. The first component of the present process is directed to the separation of and recovery of lubricants from the pads; the second component is the dry cleaning of the pads for reuse while minimizing waste products produced. Waste products are reduced in the second component by reusing dry cleaning fluid.

Referring now to FIG. 1, pads 10 are sometimes collected in barrels 12 for a period of time prior to beginning the present process. While standing in barrels 12, oil will drain down through a stack of pads 10, pooling in the bottom of barrels 12. Pads 10 at the top of the stack will be relatively free of excess oil; those at the bottom will contain excess oil, perhaps being soaked in it. The longer barrels 12 stand undisturbed, the more oil will drain to the bottom.

Pads 10 that contain excess oil are first placed on an elevated grid 20 over a collection basin 22 to drain a first portion of oil from them. The longer they are allowed to drain, the more lubricant that will drain from them. Preferably, above the bottom of basin 22 is a fine mesh grid 24, and, above that, is coarse mesh, elevated grid 20 for supporting pads 10. Oil drains through the coarse and fine mesh grids 20, 24, to the lower portion of the basin 22. Particles, dirt, metal chips and cuttings collect on fine mesh grid 24 and can be removed in a variety of ways, such as vacuuming. If pads 10 have been stored in barrel 12, oil pooled in the bottom of barrel 12 can be poured directly into collection basin 22.

After sufficient time has been allowed for draining excess oil, an hour or more, an additional portion of oil can be removed from pads 10 by centrifuging at high speed in a centrifuge 30 with a vertical axis 32 of rotation. Preferably, centrifuge 30 operates at 900–1200 revolutions per minute (RPM) so that in approximately three minutes, the excess oil is removed so that the pads have less than 2% and preferably less than 0.5% oil remaining.

From collection basin 22 and from centrifuge 30, the oil is pumped through filters 40, 42, using pumps 44, 46, respectively, to a settling tank 50. Filters 40, 42, remove additional particulate although some will collect on fine mesh grid 24 of collection basin 22 and more will settle to the bottom of the basin 22.

In settling tank 50, the oil is allowed to stand so that fine particulate settles to the bottom as sludge while the oil rises to the top. Water that has mixed with the oil tends to separate below the oil but above the heavier sludge. Separation tank 50 is equipped with a pipe 52, located within the upper region of tank 50 and in fluid communication with its interior. When the oil reaches a certain level, it enters pipe 52 and flows, by gravity, to a first barrel 54. Periodically, the oil is pumped using pump 56 through a bag filter 58 to storage tank 60. Preferably, filter 58 is sized to capture solids having a particle size greater than or equal to approximately 200 microns.

Oil from lower elevations of settling tank 50 drains to an evaporator 64. Heat from a heat source 66 is applied to evaporator 64 to remove water from this oil. Then the oil is skimmed from evaporator 64 and drained to a second barrel 68. Periodically, oil is pumped by pump 56 to holding tank 60 via bag filter 58.

The oil recovered from the pads and separated from both particulate by bag filter 58 and from water by evaporator 64 is shipped to a refinery for further processing.

In the second component of the present process, pads 10, following removal of excess oil by gravity draining and centrifuging, are dry cleaned in an industrial dry cleaning machine 80 that has been modified for the present purposes. Pads 10 have been centrifuged until approximately between 98% and 99.5% of the oil has been extracted. The second component is controlled by a computer controller 82, operating various valves and pumps and other components as will be described, so that the operation can take place efficiently.

Standard industrial dry cleaners have a single distiller to separate oils from dry cleaning fluid. The present dry cleaner has two, industrial distillers 90, 92, instead. Distillers, 90, 92, are capable of greater throughput and are more precisely controlled for better distillation. The effluent from a single washing is pumped to first distiller 90 where it is processed to clean the dry cleaning fluid, preferably perchloroethylene, by distillation the dry cleaning fluid from waste oil. The distilled perchloroethylene is then pumped to second distiller 92 where additional oil is removed. The distilled perchloroethylene from second distiller 92 is pumped to a holding tank 100 for use in dry cleaning machine 80. Even industrial stills cannot separate all the lubricants from the perchloroethylene. Approximately 7%–15% of the effluent from distillers 90,92, will be contaminated with perchloroethylene. Waste from distiller 92 is pumped to waste tank 94 for proper disposal.

When dry cleaning a petroleum-based lubricant using perchloroethylene, distillers 90, 92, must be able to achieve a temperature of approximately 265° F. to affect the phase separation. It is understood that the temperature at which separation occurs will vary as a function of both the dry cleaning fluid used and the type of lubricant removed, and therefore an artisan with ordinary skill would alter the temperature of the distillers accordingly. An example of a distiller capable of use with the present invention is sold under the trademark SIVA.

Holding tank 100 is also modified from that of conventional dry cleaning machines. The tank of conventional machines has partitions to define compartments for separating the perchloroethylene into batches. In the present tank 100, the partitions are removed or modified so that the compartments communicate with each other and, if needed, the tank 100 is enlarged so that more perchloroethylene is available for each load of pads 10.

Other modifications include replacement of pumps 84 with larger capacity pumps and replacement of smaller electrical solenoid valves with pneumatic stainless steel ball valves 86. In addition to these changes, the dry cleaner's internal lint filter is also removed. An example of an industrial dry cleaner capable of use with the present invention is the Union U-2000 L Series in the 80 pound capacity size manufactured by Union Drycleaning Products of East Point, Ga.

Wastes such as particles and metal fines from dry cleaning machine 80 are collected by trap 96 and vacuumed into waste container 98.

Pads 10 are then folded and packaged in clean plastic bags for return to the shipper. Oil from tank 60 is forwarded to a refinery for processing and reuse. Waste from various sources is sent to treatment facilities for processing and disposal.

It will be apparent to those skilled in the art that many changes and substitutions can be made to the preferred embodiment herein described without departing from the spirit and scope of the present invention as defined by the appended claims.

What is claimed is:

1. A method for recycling a pad used to absorb oil, said method comprising the steps of:

centrifuging said pad to remove a portion of oil from said pad; and drycleaning said pad in reused drycleaning fluid to remove a second portion of oil from said pad, wherein said drycleaning solution is distilled to remove oil prior to reuse, and wherein said reused dry cleaning fluid contains less than 15% oil.

2. The method as recited in claim 1, wherein said centrifuging step takes place at a rate of at least 900 RPM.

3. The method as recited in claim 1, wherein said centrifuging step takes place at a rate between 900 and 1200 RPM.

4. The method as recited in claim 1, wherein said centrifuging step is done until less than approximately 2% oil remains in said pad.

5. The method as recited in claim 1, wherein said centrifuging step is done until less than approximately 0.5% oil remains in said pad.

6. The method as recited in claim 1, wherein said reused dry cleaning fluid is distilled twice prior to reuse.

7. A method for recycling a pad used to absorb oil, said method comprising the steps of:

centrifuging said pad to remove a portion of oil from said pad; and drycleaning said pad in reused drycleaning fluid to remove a second portion of oil from said pad, wherein said drycleaning solution is distilled to remove oil prior to reuse, and wherein said reused dry cleaning fluid contains less than 7% oil.

8. The method as recited in claim 7, wherein said centrifuging step takes place at a rate of at least 900 RPM.

9. The method as recited in claim 7, wherein said centrifuging step takes place at a rate between 900 and 1200 RPM.

10. The method as recited in claim 7, wherein said centrifuging step is done until less than approximately 2% oil remains in said pad.

11. The method as recited in claim 7, wherein said centrifuging step is done until less than approximately 0.5% oil remains in said pad.

12. The method as recited in claim 7, wherein said reused drycleaning fluid is distilled twice prior to reuse.

13. A method for recycling an oil-absorbent pad, said method comprising the steps of:

draining a first portion of oil from an oil absorbent pad;

centrifuging a second portion of said absorbed oil from said pad;

filtering impurities from said first and said second portions of oil;

evaporating water from said filtered oil to recover said oil; and dry cleaning said pads in reused dry cleaning fluid to remove a third portion of said absorbed oil, wherein said drycleaning solution is distilled to remove oil prior to reuse, and wherein said reused dry cleaning fluid contains less than 15% oil.

14. The method as recited in claim 13, further comprising the step of filtering oil to stand in a holding tank to separate oil, water and sludge.

15. The method as recited in claim 14, further comprising the step of filtering said separated oil through a bag filter.

16. The method as recited in claim 13, wherein said dry cleaning fluid contains less than 7% oil.

17. Apparatus for use on oil-absorbent pads, said apparatus comprising:

means for draining a first portion of oil from said pads;

a centrifuge to remove a second portion of oil from said pads;

settling means in fluid communication with said draining means and said centrifuge for receiving said first and said second portions of said oil and allowing any water and dirt in said first and second portions to separate from said oil;

evaporation means in fluid communication with said settling means for evaporating water from said oil;

dry cleaning means adjacent to said centrifuge for dry cleaning fluid to remove a third portion of oil from said pads; and two distillers in fluid communication with said dry cleaning means, said distillers distilling said dry cleaning fluid for reuse, said dry cleaning fluid containing less than 15% oil.

18. The apparatus as recited in claim 17, wherein said dry cleaning fluid contains less than 7% oil.

19. The apparatus as recited in claim 17, wherein said two distillers distill said dry cleaning fluid in sequence.

20. The apparatus as recited in claim 17, wherein said draining means further comprises at least one grid and catch basin, said pads draining said first portion of oil gravitationally to said catch basin when placed on said at least one grid.

21. The apparatus as recited in claim 20, wherein said at least one grid further comprises two grids, one fine mesh grid and one coarse mesh grid above said fine mesh grid, said pads being placed on said coarse mesh grid.

22. The apparatus as recited in claim 17, further comprising a bag filter in fluid communication with said evaporation means for removing particulate from said oil.

* * * * *